US011833541B2

(12) United States Patent
Chupp

(10) Patent No.: US 11,833,541 B2
(45) Date of Patent: Dec. 5, 2023

(54) PROCESS FOR POWDER COATING OF OBJECTS

(71) Applicant: Steve L. Chupp, Bristol, IN (US)

(72) Inventor: Steve L. Chupp, Bristol, IN (US)

(*) Notice: Subject to any disclaimer, the term of this patent is extended or adjusted under 35 U.S.C. 154(b) by 577 days.

(21) Appl. No.: 16/873,381

(22) Filed: Apr. 4, 2020

(65) Prior Publication Data
US 2021/0308716 A1  Oct. 7, 2021

(51) Int. Cl.
*B05D 1/06* (2006.01)
*C09D 5/03* (2006.01)
*B05D 1/00* (2006.01)
*B05D 1/04* (2006.01)
*B05D 3/02* (2006.01)
*B05D 1/12* (2006.01)
*B05D 3/00* (2006.01)

(52) U.S. Cl.
CPC .............. *B05D 1/06* (2013.01); *C09D 5/032* (2013.01); *C09D 5/033* (2013.01); *B05D 1/007* (2013.01); *B05D 1/04* (2013.01); *B05D 1/045* (2013.01); *B05D 1/12* (2013.01); *B05D 3/002* (2013.01); *B05D 3/005* (2013.01); *B05D 3/0218* (2013.01); *B05D 3/0254* (2013.01); *B05D 2203/20* (2013.01); *B05D 2320/10* (2013.01)

(58) Field of Classification Search
CPC .......... B05D 1/007; B05D 1/04; B05D 1/045; B05D 1/06; B05D 1/12; B05D 2203/20; B05D 2320/10; B05D 3/002; B05D 3/005; B05D 3/0218; B05D 3/0254
USPC ........................................................ 427/458
See application file for complete search history.

(56) References Cited

U.S. PATENT DOCUMENTS

| | | | | |
|---|---|---|---|---|
| 5,824,373 | A | * | 10/1998 | Biller ................... C09D 175/16 427/520 |
| 6,005,017 | A | * | 12/1999 | Daly ..................... C08F 290/12 522/170 |
| 10,857,566 | B2 | * | 12/2020 | Chapman ............... B05D 7/546 |
| 2004/0230008 | A1 | * | 11/2004 | Correll ..................... C08J 3/243 525/327.2 |
| 2009/0304933 | A1 | * | 12/2009 | Conley .................. D06P 1/0016 524/556 |
| 2014/0127417 | A1 | * | 5/2014 | Chapman ............... B05D 1/045 427/458 |
| 2016/0074904 | A1 | * | 3/2016 | Chapman ............... B05D 1/045 250/492.1 |
| 2018/0257106 | A1 | * | 9/2018 | Chapman ............. B05D 3/0263 |
| 2020/0139400 | A1 | * | 5/2020 | McCormick ............ B05D 7/06 |

* cited by examiner

Primary Examiner — Brian K Talbot
(74) Attorney, Agent, or Firm — Ryan M. Fountain

(57) ABSTRACT

In a powder coating process, a primer step is implemented prior to electrostatically applying the powder coating, either in advance of preheating the object to be coated or subsequent thereto, depending upon the selection of materials used in the object to be coated, the primer material being diluted fabric softener applied in a fine mist spray or fog to the object.

10 Claims, No Drawings

PROCESS FOR POWDER COATING OF OBJECTS

BACKGROUND OF THE INVENTION

The present invention relates generally to processes for powder coating objects, such as furniture, fixtures, flooring and like structural features, and more particularly, to processes for powder coating hardwood materials used to make such features for use in recreational vehicles.

In general, powder coating processes have been known for a substantial period of time, as reflected in U.S. Pat. No. 2,538,562. Typically, powder coating processes involve at least two steps in the process: electrostatically applying a dry coating to the surface of an object, and then curing that coating at an elevated temperature to bond it to the object. See, e.g., https://en.wikipedia.org/wiki/Powder_coating. Previously, the object to be coated was formed, at least in part, from conductive metals, whose surfaces could be grounded during the electrostatic transfer or application of the coating material, so as to facilitate that transfer. More recently, other products, such as plastics and Medium Density Fiberboard ("MDF") wood products have been used in powder coating processes. Most recently, it has been found that certain hardwoods can also be successfully powder coated, although additional processes, such as pre-heating may be needed to accomplish that in uniform production quantities.

However, solid wood products are not usually of uniform density and/or moisture content, and are susceptible of outgassing, for example, which can damage the uniformity and/or integrity of powder coating through pin hole formation, and the like. Also, past attempts at powder coating hardwoods have resulted in discoloration of the coating, particularly when clear coat surfaces are attempted. These problems have not been found to have uniform solutions as applied to the various species of wood type used, especially when considering the changes in wood characteristics from harvest to harvest.

Objectives of the Invention

Accordingly, a primary objective of this invention is to provide an improvements to powder coating processes which allow powder coats to be applied to a wider variety of materials and surface types. These improvements include providing an improved process which:

a. is inexpensive to use and maintain,
b. can be applied to a wide variety of hardwoods and other materials,
c. is readily implemented in pre-existing powder coating systems,
d. does not adversely affect the cured powder coating, and
e. facilitates use for a wide variety of object shapes and surface configurations,

SUMMARY OF THE INVENTION

These and other objectives of the present invention are achieved by the provision of a primer step prior to electrostatically applying the powder coating, either in advance of preheating the object to be coated or subsequent thereto, depending upon the selection of materials used in the object to be coated, the primer material being diluted fabric softener applied in a fine mist spray or fog to the object.

Other objects, advantages, and novel features of the present invention will become readily apparent from the following detailed description of certain preferred and alternative embodiments.

DETAILED DESCRIPTION OF PREFERRED EMBODIMENTS

The present invention is an additional process step in conventional or pre-existing powder coating processes wherein a primer material is applied to the surface of the article or object which is to be powder coated. This extra process step is included prior to electrostatically applying the powder to the surface of the object. The primer material is conventional fluid fabric softener, such as Downy® fabric softener. Preferably, this fabric softener is diluted, such as by adding an equal volume of water, prior to application. Application of the primer material to the object is accomplished by passing the surface of the object through or subjecting it to a "fine mist spray" or fog of the primer material, such that primer material covers the entire surface. This "fine mist spray" is defined by the equivalent result of spraying the primer material (the 50% diluted Downey fabric softener) through a SATAjet® 5000 B spray gun using a 1.4 tip at 35 psi air setting. After the primer coating is applied, the powder coating is applied and then cured at elevated temperatures, in a conventional or pre-existing manner.

It is believed that fabric softener applied in this manner increases the ability of the surface to support an electrostatic charge which attracts the coating to the surface. Accordingly, the present invention anticipates the use of similar fluid primer materials applied to the surface in a similar manner to achieve this result.

In specific applications, such as very dry wood boards, the primer step of this invention can be used prior to conventional or pre-existing steps for pre-heating the object prior to applying the powder. In other specific applications, such as when the object to be coated is made from with Beech or Maple hardwoods having a moisture content within the normal range for such commercially available woods, the primer step of this invention can be used after the conventional or pre-existing steps for pre-heating the object.

In certain specific applications it is believed to be advantageous to allow sufficient time between applying the primer and applying the powder for the primer to be absorbed, at least in part, into the surface of the object to be coated, rather than having the primer merely exist on the surface of that object. In specific applications, it is also believed to be advantageous to allow the primer to react chemically with the surface of the object so as to form part of the permanent bond of the coating with that surface.

Although the present invention has been shown and described herein with respect to certain preferred embodiments and alternative configurations, those were by way of illustration and example only. For example, while wood, and hardwood in particular, has been used as an example for the material forming the object to be coating, the present invention is also believed to be useful where other materials, having a hydroscopic surface, are used to form that object. Accordingly, the spirit and scope of the present invention is intended to be limited only by the terms of the appended claims.

What is claimed is:

1. A process for powder coating, having the steps of electrostatically applying a coating to the surface of an object and then curing that coating at an elevated temperature, the improvement including the step of applying a primer to the surface of the object prior to applying the coating, wherein the primer includes fluid fabric softener.

2. The process according to claim 1 wherein the primer material includes a volume of water to dilute the fluid fabric softener prior to application of the primer.

3. The process according to claim 2 wherein the volume of water is substantially equal to the volume of fabric softener.

4. The process according to claim 1 wherein the primer reacts chemically with the surface to form part of a permanent bond of the coating with the surface.

5. A process for powder coating, having the steps of electrostatically applying a coating to the surface of an object and then curing that coating at an elevated temperature, the improvement including the step of applying a primer to the surface of the object prior to applying the coating, wherein the primer includes fluid fabric softener, and wherein the primer is applied to the surface of the object by a fine mist spray.

6. The process according to claim 5 wherein the surface is formed from wood material.

7. The process according to claim 6 wherein the wood material is a hardwood selected from the group of beech and maple.

8. The process according to claim 7 wherein the powder coating process also includes a preheating step to elevate the temperature of the object prior to applying the coating, and the primer is applied to the surface of the object after the preheating step and before applying the coating to the surface.

9. The process according to claim 7 wherein the powder coating process includes a preheating step to elevate the temperature of the object prior to applying the coating, and the primer is applied to the surface of the object before the preheating step.

10. A process for powder coating, having the steps of electrostatically applying a coating to the surface of an object and then curing that coating at an elevated temperature, the improvement including the step of applying a primer to the surface of the object prior to applying the coating, wherein the primer includes fluid fabric softener, and wherein the surface of the object is a hydroscopic surface and the primer is applied to that hydroscopic surface and allowed sufficient time to be absorbed therein prior to applying the coating.

* * * * *